US011938681B2

(12) United States Patent
Fornos Martinez et al.

(10) Patent No.: US 11,938,681 B2
(45) Date of Patent: Mar. 26, 2024

(54) COLOURED OBJECT GENERATION

(71) Applicant: Hewlett-Packard Development Company, L.P., Spring, TX (US)

(72) Inventors: Pol Fornos Martinez, Sant Cugat del Valles (ES); Maria de las Mercedes Blanco Rollan, Sant Cugat del Valles (ES); Ismael Fernandez Aymerich, Sant Cugat del Valles (ES); Adam Franks, Grenoble (FR)

(73) Assignee: Hewlett-Packard Development Company, L.P., Spring, TX (US)

( * ) Notice: Subject to any disclaimer, the term of this patent is extended or adjusted under 35 U.S.C. 154(b) by 172 days.

(21) Appl. No.: 15/734,594

(22) PCT Filed: Mar. 15, 2019

(86) PCT No.: PCT/US2019/022484
§ 371 (c)(1),
(2) Date: Dec. 3, 2020

(87) PCT Pub. No.: WO2020/190262
PCT Pub. Date: Sep. 24, 2020

(65) Prior Publication Data
US 2021/0394447 A1 Dec. 23, 2021

(51) Int. Cl.
*B29C 64/393* (2017.01)
*B29C 64/165* (2017.01)
(Continued)

(52) U.S. Cl.
CPC .......... *B29C 64/393* (2017.08); *B29C 64/165* (2017.08); *B33Y 50/02* (2014.12); *B29K 2995/0021* (2013.01); *B33Y 10/00* (2014.12)

(58) Field of Classification Search
CPC ... B29C 64/165; B29C 64/393; B29C 64/386; B33Y 10/00; B33Y 50/02; B33Y 50/00; B29K 2995/0021
(Continued)

(56) References Cited

U.S. PATENT DOCUMENTS 6,306,319 B1 10/2001 Swain et al.
6,375,874 B1 4/2002 Russell et al.
(Continued)

FOREIGN PATENT DOCUMENTS

CN 105346268 A 2/2016
CN 107073826 A 8/2017
(Continued)

OTHER PUBLICATIONS

Ju, Y., et al., "Visualization of the complex structure and stress field inside rock by means of 3D printing technology", Chinese Science Bulletin, vol. 59, Issue 36, Dec. 25, 2014, pp. 5354-5365.
(Continued)

*Primary Examiner* — Chun Cao
(74) *Attorney, Agent, or Firm* — Michael Dryja (57) ABSTRACT

In one example a method of generating a three-dimensional object in a 3D printing system using a fusing agent of a first colour and a build material having a second colour different from the first colour, and a detailing agent, comprises obtaining object model data describing an object to be generated, and determining a first portion of the object to be generated to have the second colour. The method comprises determining object generation instructions to generate the object by defining a gap region of a layer of build material that is to correspond to the first portion of the object to have the second colour on which no agents are to be applied, a band of detailing agent on a layer of build material immediately adjacent to the gap region to define an outer limit of
(Continued)

the gap region and therefore a boundary of the first portion of the object, and a fusing agent region on a layer of build material adjacent to the gap region on which fusing agent is to be applied.

20 Claims, 6 Drawing Sheets

(51) Int. Cl.
*B33Y 50/02* (2015.01)
*B33Y 10/00* (2015.01)

(58) Field of Classification Search
USPC .......................................................... 700/118
See application file for complete search history.

(56) References Cited

U.S. PATENT DOCUMENTS

| | | |
|---|---|---|
| 6,904,243 B2 | 6/2005 | Smith et al. |
| 6,989,065 B2 | 1/2006 | Tabor et al. |
| 7,678,317 B2 | 3/2010 | Khouri et al. |
| 7,991,498 B2 | 8/2011 | Kritchman |
| 9,990,447 B2 | 6/2018 | Dawson et al. |
| 10,060,099 B2 | 8/2018 | Serrurier et al. |
| 10,906,247 B2 | 2/2021 | Flores et al. |
| 11,577,463 B2 | 2/2023 | Huang et al. |
| 2004/0080078 A1 | 4/2004 | Collins |
| 2005/0072113 A1 | 4/2005 | Collins et al. |
| 2007/0183918 A1 | 8/2007 | Monsheimer et al. |
| 2007/0241482 A1 | 10/2007 | Giller et al. |
| 2015/0125334 A1 | 5/2015 | Uetani et al. |
| 2015/0352639 A1 | 12/2015 | Toyserkani et al. |
| 2016/0026001 A1 | 1/2016 | Nishimura et al. |
| 2016/0037443 A1 | 2/2016 | Kim et al. |
| 2016/0082537 A1 | 3/2016 | Weber et al. |
| 2016/0243761 A1 | 8/2016 | Okamoto |
| 2016/0260001 A1 | 9/2016 | Flores et al. |
| 2016/0332380 A1 | 11/2016 | De et al. |
| 2016/0374431 A1 | 12/2016 | Tow |
| 2017/0232677 A1 | 8/2017 | Emamjomeh et al. |
| 2017/0246807 A1 | 8/2017 | Emamjomeh et al. |
| 2017/0297106 A1* | 10/2017 | Myerberg ............... B33Y 40/20 |
| 2018/0001550 A1* | 1/2018 | Zhao .................... B29C 64/153 |
| 2018/0015663 A1* | 1/2018 | Zhao ...................... B22F 12/90 |
| 2018/0022923 A1 | 1/2018 | Emamjomeh et al. |
| 2018/0065297 A1 | 3/2018 | Zhao et al. |
| 2018/0104897 A1 | 4/2018 | Novicek |
| 2018/0117856 A1 | 5/2018 | Ochi |
| 2018/0147670 A1 | 5/2018 | Wiggins et al. |
| 2018/0186079 A1 | 7/2018 | Vilajosana et al. |
| 2018/0196407 A1 | 7/2018 | Lee et al. |
| 2018/0319086 A1 | 11/2018 | Klammer et al. |
| 2018/0361653 A1 | 12/2018 | Hakkaku et al. |
| 2018/0370122 A1 | 12/2018 | MacCormack et al. |
| 2019/0039296 A1 | 2/2019 | Prasad et al. |
| 2021/0122119 A1 | 4/2021 | Fornos et al. |
| 2021/0187617 A1 | 6/2021 | Zaepernick et al. |
| 2021/0221053 A1 | 7/2021 | De et al. |

FOREIGN PATENT DOCUMENTS

| | | |
|---|---|---|
| CN | 107206685 A | 9/2017 |
| CN | 108699366 A | 10/2018 |
| CN | 109070454 A | 12/2018 |
| CN | 109070458 A | 12/2018 |
| EP | 3094470 A1 | 11/2016 |
| EP | 3230383 A1 | 10/2017 |
| JP | 2005-254521 A | 9/2005 |
| JP | 2016-168828 A | 9/2016 |
| JP | 2017-530881 A | 10/2017 |
| JP | 2018-531820 A | 11/2018 |
| WO | 2016/010590 A1 | 1/2016 |
| WO | WO-WO2016077250 A1 | 5/2016 |
| WO | 2016/171724 A1 | 10/2016 |
| WO | WO-WO2016196382 A1 | 12/2016 |
| WO | 2017/019102 A1 | 2/2017 |
| WO | 2017/074397 A1 | 5/2017 |
| WO | 2017/074447 A1 | 5/2017 |
| WO | 2017/131757 A1 | 8/2017 |
| WO | 2017/131764 A1 | 8/2017 |
| WO | WO-2017162306 A1 | 9/2017 |
| WO | 2017/174112 A1 | 10/2017 |
| WO | 2017/186278 A1 | 11/2017 |
| WO | 2017/188965 A1 | 11/2017 |
| WO | 2017/188966 A1 | 11/2017 |
| WO | 2017/194126 A1 | 11/2017 |
| WO | 2017/196321 A1 | 11/2017 |
| WO | 2017/196328 A1 | 11/2017 |
| WO | 2017/196346 A1 | 11/2017 |
| WO | 2017/196353 A1 | 11/2017 |
| WO | 2017/200533 A1 | 11/2017 |
| WO | WO-2017213666 A1 | 12/2017 |
| WO | 2018/017084 A1 | 1/2018 |
| WO | WO-2018006935 A1 | 1/2018 |
| WO | WO-WO2018010773 A1 | 1/2018 |
| WO | 2018/022034 A1 | 2/2018 |
| WO | 2018/022093 A1 | 2/2018 |
| WO | 2018/080456 A1 | 5/2018 |
| WO | 2018/194542 A1 | 10/2018 |
| WO | 2019/013745 A1 | 1/2019 |
| WO | 2019/013746 A1 | 1/2019 |
| WO | 2019/013752 A1 | 1/2019 |
| WO | 2019/017869 A1 | 1/2019 |
| WO | 2019/083530 A1 | 5/2019 |
| WO | 2019/108200 A1 | 6/2019 |
| WO | 2019/177612 A1 | 9/2019 |
| WO | 2019/194836 A1 | 10/2019 |
| WO | 2019/209262 A1 | 10/2019 |
| WO | 2019/212485 A1 | 11/2019 |
| WO | 2019/245516 A1 | 12/2019 |
| WO | 2019/245520 A1 | 12/2019 |

OTHER PUBLICATIONS

Yu, G., et al., "Research on the Realization method of 3D Printing System of Metal Powder Based on Digital Micro Injection", Journal of Nanjing University, vol. 17, Issue 03, Sep. 2017, pp. 6, (English Abstract Submitted).

* cited by examiner

COLOURED OBJECT GENERATION

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected sub-regions. In other techniques, chemical solidification methods may be used.

BRIEF DESCRIPTION OF DRAWINGS

Non-limiting examples will now be described with reference to the accompanying drawings, in which.

DETAILED DESCRIPTION

Additive manufacturing techniques may generate a three-dimensional object through the solidification of a build material. In some examples, the build material is a powder-like granular material, which may for example be a plastic or ceramic powder and the properties of generated objects may depend on the type of build material and the type of solidification mechanism used. Build material may be deposited, for example on a print bed and processed layer by layer, for example within a fabrication chamber. According to one example, a suitable build material may be PA12 build material commercially known as V1R10A "HP PA12" available from HP Inc.

In some examples, selective solidification is achieved through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto regions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material coalesces and solidifies upon cooling to form a slice of the three-dimensional object in accordance with the pattern. In this way, adding fusing agent to areas of the build material may change the absorptivity of those areas of the build material. In other examples, coalescence may be achieved in some other manner.

In an example, a suitable fusing agent may be an ink-type formulation comprising carbon black, such as, for example, the fusing agent formulation commercially known as V1Q60A "HP fusing agent" available from HP Inc. In some examples, a fusing agent may comprise at least one of an infra-red light absorber, a near infra-red light absorber, a visible light absorber and a UV light absorber. Examples of print agents comprising visible light enhancers are dye based coloured ink and pigment based coloured ink, such as inks commercially known as CE039A and CE042A available from HP Inc. Adding a coloured fusing agent (for example a black fusing agent) may change the colour of the build material to which it is applied. For example, adding a black fusing agent to a white build material may result in the corresponding parts of the three-dimensional object to be generated being dark (e.g. black) in appearance.

In addition to a fusing agent, in some examples, a coalescence modifier agent may be used which acts to modify the effects of a fusing agent for example by modifying coalescence or to assist in producing a particular finish or appearance to an object, and such agents may therefore be termed detailing agents. Detailing agents may also be applied to produce a cooling effect. In some examples, detailing agent may be used near edge surfaces of an object being printed. According to one example, a suitable detailing agent may be a formulation commercially known as V1Q61A "HP detailing agent" available from HP Inc. A colouring agent, for example comprising a dye or colorant, may in some examples be used as a fusing agent or a coalescence modifier agent to provide a particular colour for the object.

As noted above, additive manufacturing systems may generate objects based on structural design data. This may involve a designer generating a three-dimensional model of an object to be generated, for example using a computer aided design (CAD) application. The model may define the solid portions of the object, and in some examples properties such as colour, strength, density and the like. To generate a three-dimensional object from the model using an additive manufacturing system, the model data may in some examples be processed to generate slices of parallel planes of the model. Each slice may define a region of a respective layer of build material that is to be solidified or caused to coalesce by the additive manufacturing system.

When heat is applied to an area of a build material that is treated with fusing agent, heat from the area of build material may bleed into surrounding areas (e.g. in the same layer or between layers) and cause adjacent areas of build material (which were not intended to form a portion of the object being generated) to at least partially fuse and become a portion of the generated object. This may lead to objects having dimensions larger than were defined in an object model describing the object to be generated. To improve dimensional accuracy, a detailing agent may be applied immediately adjacent to areas of build material on which fusing agent is applied to reduce, or in some examples prevent, this thermal bleed from these areas of build material. In this way, a detailing agent may be applied to define the surface geometry of the object being generated.

Some examples herein relate to using this thermal bleed effect to define the geometry of the object being generated by applying detailing agent to control the thermal bleed into areas of the build material to which no agents were applied. These examples may allow objects to generated having both dark (e.g. black) portions and light (e.g. white) portions, if a dark (e.g. black) fusing agent and light (e.g. white) build material are used. According to some examples, a detailing agent is applied to a boundary of an area of build material untreated by fusing agent (e.g. an area of build material to which no agents are applied, herein referred to as a "gap region" of build material) to control the extent of thermal bleed through the untreated area from an adjacent region on which fusing agent has been applied. In this way, heat will be permitted to bleed into the gap region up to the detailing agent boundary which defines that region and therefore which defines a boundary of part of the object.

The area of build material untreated by fusing agent will have the colour of the build material, whilst build material on which fusing agent is applied will have the colour of (or related to) the colour of the fusing agent. For example, a black fusing agent and a white build material may be used in the additive manufacturing process. In this example when heat is applied to a layer of build material having a region on which fusing agent has been applied, the thermal bleed from the region on which fusing agent was applied will thermally fuse (and, upon cooling, solidify) an adjacent area of the white build material to which no fusing agent is applied up to the detailing agent boundary. This untreated, solidified, area of build material, having been fused by the thermal bleed, will form a region of the generated object that has the colour of the build material. As will be described with reference to specific examples below, the dimensions of the region of build material to which no agents area applied may be determined as part of the method, and may be dependent on the geometry of the object to be generated and/or the type of build material being used to generate the object. Therefore, some examples herein relate to generating an object using a fusing agent and a build material, with a portion of the object having the colour of the build material.

Figure 1:
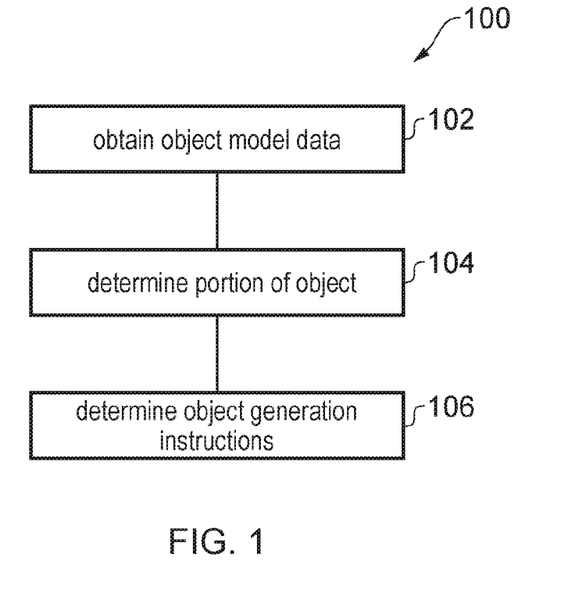
FIG. 1 is a flowchart of an example method of generating a three-dimensional object in a 3D printing system.

FIG. 1 is an example method 100 of generating a three-dimensional object in a 3D printing system using a fusing agent of a first colour, a detailing agent (e.g. a transparent detailing agent), and a build material of a second colour, the second colour being different from the first colour. The second colour may have a different colour property to the first colour. For example, the second colour may have a different hue, tint, shade, tone, saturation, lightness, chroma, intensity, brightness, reflectance, and/or greyscale. In one example the second colour is darker than the first colour. The method 100 may comprise a computer implemented method and/or may comprise generating at least one object by additive manufacturing. The method comprises, in block 102, obtaining (e.g. by a processor) object model data, the object model data describing at least a portion of an object to be generated (e.g. in additive manufacturing).

The object model data may comprise data representing at least a portion of an object to be generated by an additive manufacturing apparatus by fusing (e.g. thermal fusing through application of energy) or solidifying a build material. The object model data may, for example, comprise a Computer Aided Design (CAD) generated model, and/or may, for example, be represented in a suitable file format, such as in a STereoLithographic (STL) data file. In some examples, the object model data may be received over a network, or received from a local memory or the like. In some examples, the object model data may define the shape of the portion of an object, i.e. its geometry. In some examples, the data may additionally define an appearance property, for example at least one intended colour, pattern, translucency, gloss or the like. In some examples the data may define at least one mechanical property, for example strength, density, resilience or the like. In some examples, the data may define at least one functional property, for example, conductivity in at least one object portion. Such properties may be associated with regions of the object, for example a colour may be defined at an object surface.

In some examples, the object may be defined in terms of sub-volumes, each of which represents a region of the object which is individually addressable in object generation. In some examples herein, the sub-volumes may be referred to as voxels, i.e. three-dimensional pixels, wherein each voxel occupies or represents a discrete volume. In some examples of additive manufacturing, three-dimensional space may be characterised in terms of such voxels. In some examples, the voxels may be determined bearing in mind the print resolution of an object generation apparatus, such that each voxel represents a region which may be uniquely addressed when applying print agents, and therefore the properties of one voxel may vary from those of neighbouring voxel(s). In other words, a voxel may correspond to a volume which can be individually addressed by an object generation apparatus (which may be a particular object generation apparatus, or a class of object generation apparatus, or the like) such that the properties thereof can be determined at least substantially independently of the properties of other voxels. For example, the 'height' of a voxel may correspond to the height of a layer of build material. In some examples, the resolution of an object generation apparatus may exceed the resolution of a voxel. In general, the voxels of an object model may each have the same shape (for example, cuboid or tetrahedral), but they may in principle differ in shape. In some examples, voxels are cuboids having the height of a layer of build material. In some examples, in processing object model data representing an object, each voxel may be associated with properties, and/or object generation instructions, which apply to the voxel as a whole.

In other examples, the object may be described in some other way, for example using a vector or polygon mesh-based model. In some such examples, a voxel model may be derived from another model type.

In some examples, the method of FIG. 1 may be carried out on a slice-by-slice basis. In some examples, each slice may correspond to a layer of an object to be generated in a layer-by-layer additive manufacturing process. In some examples, such slices may be slices of a virtual build volume modelling an intended 'real' build volume, and may comprise slices taken from more than one object model. In some examples, the slices may be one voxel thick.

The method 100 comprises, at block 104, determining a first portion of the object to be generated (as defined by the object model data obtained at block 102) to have the second colour. Block 104 therefore comprises determining a first portion of the object to be generated to have the colour of the build material.

The method 100 comprises, at block 106, determining (e.g. by a processor) object generation instructions to generate the object by defining a gap region of a layer of build material that is to correspond to the first portion of the object (that is to have the second colour) and on which no agents are to be applied (e.g. no fusing agent or detailing agent), by defining a band of detailing agent on a layer of build material immediately adjacent to the gap region to define an outer limit of the gap region and therefore a boundary of the first portion of the object, and by defining a fusing agent region on a layer of build material adjacent to the gap region on which fusing agent is to be applied. The gap region, band of detailing agent, and the fusing agent region may be part of a single (e.g. the same) layer of build material and/or may be part of different layers of build material. For example, the gap region, band of detailing agent, and the fusing agent region may each be a different region on a single layer of build material. On the other hand, in other examples the fusing agent region may be part of a first layer, the gap region may be part of a second layer, and the band of detailing agent may be part of a third layer. In some examples, the gap region, band of detailing agent, and fusing agent region may be spread across multiple layers, in other words, the fusing agent region may be a part of multiple layers of build material with the gap region and/or the detailing agent band being part of different layers, or part of one of the layers that comprises the fusing agent region. The first portion may be part of an external surface, or internal portion, of the object to be generated. The gap region may therefore be delimited, on a first side, by the band of detailing agent and, on a second side, by a region of fusing agent region. For example, the gap region may be in between the band of detailing agent and a region of fusing agent. This configuration will ensure that heat is able to migrate from the first region into and through the clear band but is controlled by the band of detailing agent. In other words, heat from the fusing agent region may migrate across the gap region causing the gap region to melt, fuse and coalesce, but the band of detailing agent will mean that the build material to which detailing agent has been applied will not heat sufficiently to melt and fuse. Effectively, therefore, it is the innermost boundary (the boundary of the detailing agent band having an interface/sharing a border with the gap region) of the detailing agent region that defines the geometry of the first portion of the object to be generated, and may in some examples define the geometry of the object itself.

In some examples the method 100 comprises determining a second portion of the object to have the first colour (e.g. the colour of the fusing agent). In these examples the object generation instructions are to generate the object by defining a fusing agent region on a layer of build material that is to correspond to the second portion, and on which fusing agent is to be applied, and a band of detailing agent immediately adjacent to the fusing agent region corresponding to the second portion. In this way the heat from the fusing agent region is controlled by the band of detailing agent so that the build material in the detailing agent band will not heat sufficiently to melt and fuse. In this way the detailing agent band will define the geometry of the second portion of the object.

Figure 2A:
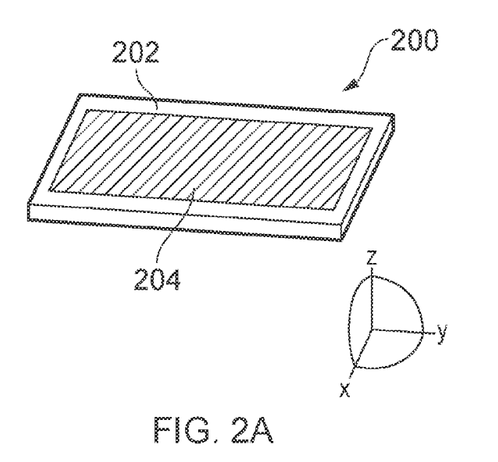
FIGS. 2A-D show schematically part of a method of generating a three-dimensional object in a 3D printing system.
Figure 2B:
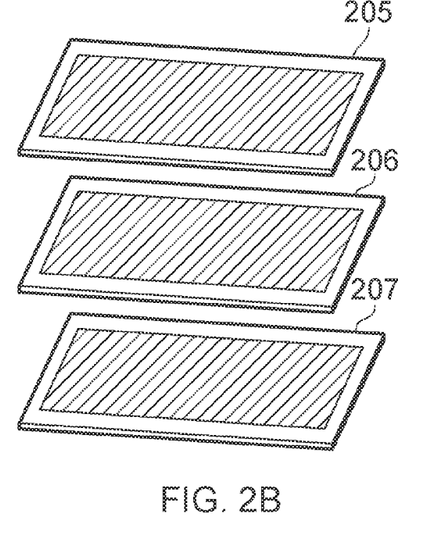

Examples of this method will now be described with references to FIGS. 2a-2c. FIG. 2a depicts an object model 200 describing an object. The object 200 contains a portion 202 (which is shown as a boundary of the object 200) that is to be the colour of the build material that is used to generate the object slice 200. The slice 200 contains another portion 204 which may be considered as the 'core' of the object slice 200, surrounded by the boundary portion 202. The colour of the portion 204 may or may not be defined (and in one example may be the colour of the fusing agent. Therefore, in this example part of the boundary, or external surface, of the object defined by the model 200 is to be the second colour (portion 202), and part of the boundary, or external surface, of the object is to be the first colour (portion 204). The object model 200 may be 'sliced' into a number of slices based on the thickness of the layer(s) of build material that will be used to generate the object from the object model 200. In this example the object model 200 is sliced horizontally relative to FIG. 2a (e.g. sliced by planes parallel to the z-axis, which is represented in FIG. 2a as the vertical axis) into three slices 205, 206, 207, e.g. a set of three 2D images that together define the object model 200, as shown in FIG. 2B. In this particular example, each of the three slices 205, 206, 207 comprises a region that is to be the colour of the fusing agent, and a region (the boundary 202) that is to be the colour of the build material. A printer will process each of these three slices to determine the print agents to be applied to three layers of build material, which each layer corresponding to one slice.

Figure 2C:
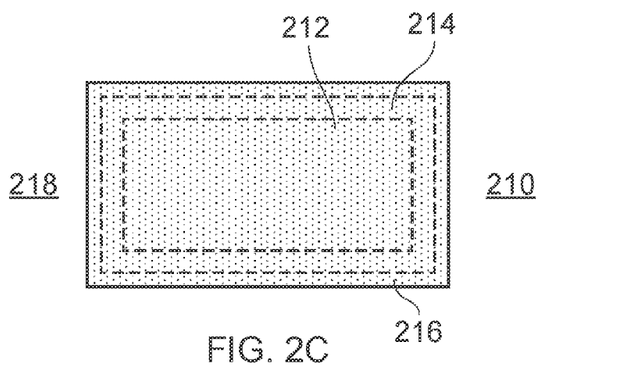

FIG. 2c shows a plan view of a layer 210 of build material based on the 'middle' slice 206 of the object model 200. FIG. 2c shows a single layer 210 of build material on which fusing agent and detailing agent are to be applied, prior to the application of agents. In other words, FIG. 2c illustrated how the object generation instructions (determined at block 106 of the method 100) are to generate the first portion of the object defined by the object model 200 by defining the fusing agent region, gap region, and detailing agent band on a layer, or layers, of build material. As will be described in this particular example, each of the fusing agent region, detailing agent band, and gap region are defined on a single layer of build material but in other examples they may be defined across multiple layers. FIG. 2c shows that, to generate the slice 206 of the object model 202, a region of fusing agent, a band of detailing agent, and a gap region are defined on the layer 210. For example, a fusing agent region 212 is a region of the layer 210 on which fusing agent is to be applied, a gap region 214 is a region of the layer 210 on which no agents are to be applied, and a band of detailing agent 216 is a region of the layer 210 immediately adjacent to the gap region 214 on which detailing agent is to be applied. The detailing agent band 216 therefore defines an outer limit of the gap region 214. More specifically, the innermost boundary of the detailing agent band 216 defines the outer limit of the gap region 214. As will be shown, the gap region 214 corresponds to the portion of the slice 206 comprising the boundary 202 that is to have the colour of the build material. The detailing agent band 216 (or the innermost boundary thereof) therefore defines the outer limit of the object defined by the model 202, as will be shown. A region 218 of the layer 210 is a region outside of the detailing agent band 216. This is a region on which no agents are to be printed.

When energy is applied to the layer 210 of build material, the region 212 of build material on which fusing agent has been applied heats up more than regions of the layer on which no fusing agent is applied and causes this region 212 of the build material to melt, fuse, and coalesce. Thermal bleed from this region migrates into the gap region 214 on which no detailing agent (or fusing agent) was applied causing build material in this region 214 to also melt, fuse, and coalesce. The thermal bleed is reduced/stopped by the band of detailing agent 216, which prevents build material in (region 216) and beyond (region 218) the detailing agent band 216 from heating up sufficiently to melt and fuse. Therefore, the build material 218 outside of the region 216 remains non-solidified.

Figure 2D:
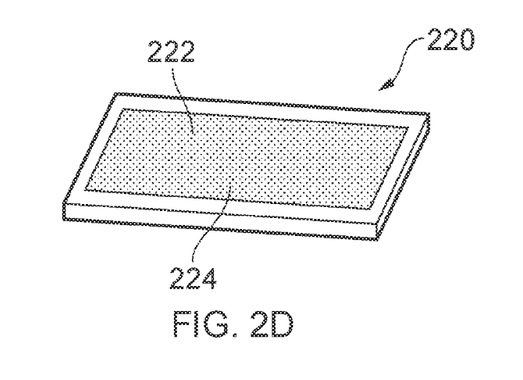

FIG. 2d shows the object 220 after it is removed from the build chamber. The object 220 comprises three layers, each corresponding to a layer of build material (each of which in term is based on a slice of the object model). After application of fusing energy to the layer 210 of build material (shown in FIG. 2c), and to the other layers of build material describing the two other slices 205, 207, the object 220 comprises a solidified region 222 (corresponding to region 204 of the object model 200 of FIG. 2a and corresponding to the fusing agent regions 212 of the layers 210 of build material used to generate the object) having the colour of the fusing agent, and a solidified region 224 (corresponding to the region 202 of the object model 200 of FIG. 2a and corresponding to the gap regions 214 of the layers 210 of build material) having the colour of the build material. As can be seen, the object geometry is delimited by the band(s) of detailing agent 216. In other words, the application of detailing agent to the build material effectively defines a boundary up to which the build material solidifies and therefore defines the geometry of the object, in this example. In any case, the detailing agent band defines the boundary of the region of the object that is to have the colour of the build material. In other words, the outer surface of the first portion corresponds to the intended geometry of the first portion of the object model, and in some examples (e.g. when the object model describes a sphere as for FIG. 3) the outer surface of the whole object corresponds to the intended geometry of the object model.

It will therefore be appreciated that the fusing agent region, gap region and detailing agent band may, in some examples, be part of the same layer of build material (for example the layer 201 as shown in FIG. 2c). In other examples the gap region may be provided in a separate layer to the fusing agent region and/or the detailing agent band.

Figure 3A:
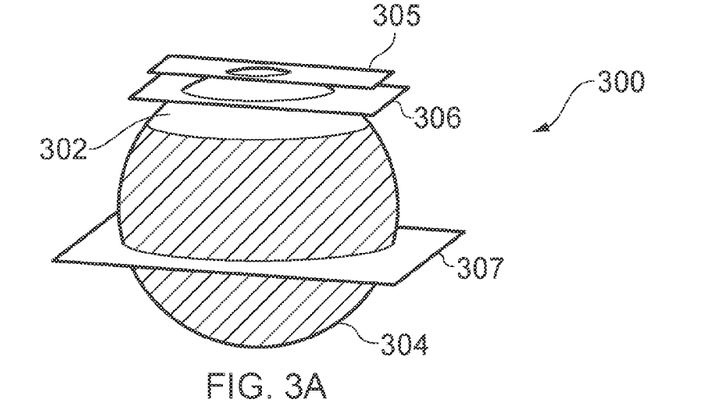
FIGS. 3A-B show schematically part of a method of generating a three-dimensional object in a 3D printing system.

FIG. 3A schematically shows an object model 300 which is a sphere, part of the external surface of which is intended to have a portion 302 that is to be the colour of the build material, and a portion 304 that is to be the colour of the fusing agent. Therefore, in examples when a white build material is used with a black fusing agent the object model 300 describes a sphere whose lower portion 304 is to be substantially black sphere and whose upper portion 302 is to be substantially white, e.g. substantially the colour of the build material. In this example the (spherical) geometry of the object is defined not just by the dark portion 304 but by the light portion 302. FIG. 3A also schematically shows three slices 305, 306, and 307 of the object model 300 (e.g. following slicing of the object model for processing by a printer). Slice 305 is taken at a pole of the sphere in the first portion 302, slice 306 is taken through the first portion away from the pole, and slice 307 is taken through the second portion 304. In other words, part of the object model defined by the slices 305, 306 are intended to have the colour of the build material (the part of the slices corresponding to the external surface of the sphere), and part of the object model defined by the slice 307 is to have the colour of the fusing agent.

Figure 3B:
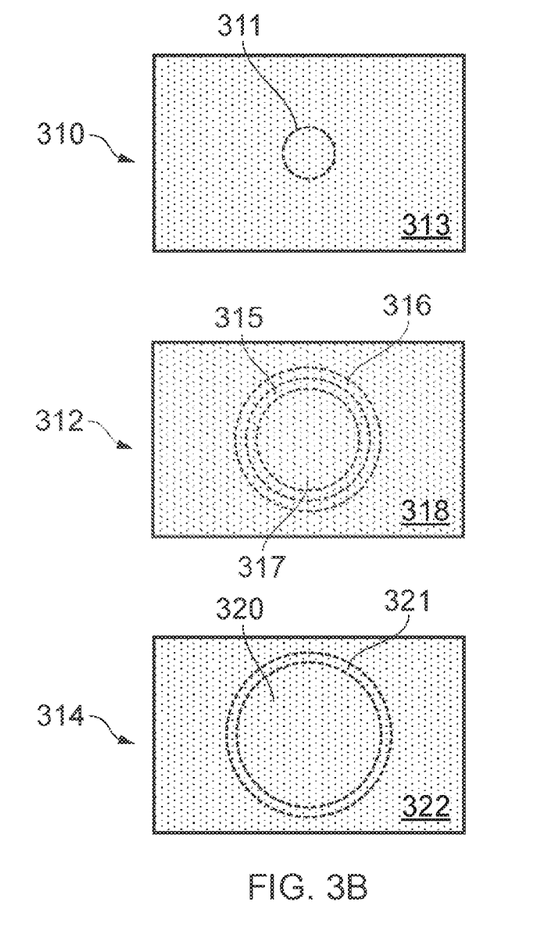

FIG. 3B shows three schematic plan views of three layers of build material in a build bed. Whereas FIG. 2b showed 3 adjacent slices, FIG. 3a shows three spatially distant slices for illustration purposes. FIG. 3b shows three layers of build material, each corresponding to one of the three spatially distant slices shown in FIG. 3a, prior to the application of agents to illustrate how object generation instructions are to generate the object defined by the object model 300 by defining a fusing agent region, band of detailing agent, and gap region of build material. The layer 310 is a layer of build material corresponding to the slice 305, layer 312 is a layer of build material corresponding to the slice 306 and layer 314 is a layer of build material corresponding to the slice 307. The layer 310 comprises a detailing agent region 311 that is to define the geometry of the pole of the sphere. In other words, the geometry of the sphere is to be defined by a solidified portion corresponding to a fusing agent region and a portion the colour of the build material corresponding to the gap region, fusing up to the detailing agent band 311 in the layer 310. A region 313 of the layer 310 is a region of fusing agent to which no agents are to be applied and which, following the application of energy, will remain un-fused. The layer 312 corresponds to the slice 306 and comprises a gap region 315 that is to correspond to the portion of the object model 300 to have the colour of build material. Accordingly, no agents are to be applied to the gap region. A detailing agent band 316 (on which detailing agent is to be applied) is immediately adjacent to the gap region 315 and defines the outer limit of the gap region 315 and therefore the boundary of the object in this layer. Therefore, detailing agent band 316, together with the detailing agent band 311 in a different layer define part of the boundary of the object. A fusing agent region 317 is adjacent the gap region 315 and on which fusing agent is to be applied. Following the application of energy to the layer 312 the fusing agent region 317 (on which fusing agent has been applied) heats up more than the gap region 315 (to which no agents are applied) and causes the build material to melt, fuse, and coalesce. Thermal bleed from the fusing agent region 317 migrates into the gap region 315 causing the gap region 315 to melt, fuse and coalesce by the thermal bleed, and therefore coalesce to form part of the object. The thermal bleed is reduced and/or stopped by the detailing agent band 316 which therefore defines the boundary of the object in this slice. The detailing agent band 316 will therefore prevent build material beyond the detailing agent region (e.g. the region 318) from heating up sufficiently to melt and fuse, and the build material in the detailing agent band and in the region 318 will therefore not coalesce to form part of the object. The region 318 of build material will remain un-fused.

The layer 314 of build material corresponds to the slice 317. In this example the exterior and interior of the sphere are intended to be the colour of the fusing agent. In other words, no part of the object model 300 defined by the slice 307 is to have the colour of the build material. Accordingly, the layer 314 of build material corresponding to the slice 307 comprises a fusing agent region 320 on which fusing agent will be applied. The fusing agent region 320 in this example is surrounded by a detailing agent band 321 on which detailing agent is applied. The detailing agent band is immediately adjacent the fusing agent region so that, following application of energy the build material in the fusing agent region 320 will melt, fuse, and coalesce, but the build material in the detailing agent band 321 will not heat sufficiently to melt and fuse. Therefore, the detailing agent band 321 defines the boundary of the fusing agent region 320 and therefore the object geometry.

FIGS. 2 and 3 show examples where the first portion of the object to be generated (to have the colour of the build material) are part of an external surface of the object however in other examples the first portion may be part of an internal portion of the object, and as above may be contained in a single layer, or across multiple layers, of build material.

In one example, the build material comprises PA12, PA11 and/or PP and the control data may be to apply fusing agent to the first region at a contone level of between 50-100 (e.g. 60) (which may in some examples represent between 20-40% of the maximum contone level that is deliverable from a printer generating the object).

Therefore, the method may generate objects having both black and white portions, using a single black fusing agent and a white build material. These regions are suitable for post-processing operations such as dyeing or colouring the object.

As will be explained below the dimensions of the gap region (e.g. width, for example the width of the gap region from the interface between the fusing agent region corresponding to the first portion and the gap region to the interface between the gap region and the band of detailing agent) may be calculated (e.g. based upon the type of build material being used and/or the geometry of the object) and in one example may be between 80 µm to 1 mm.

In some examples therefore the portions of the object to have the first and/or second colour may be any portions the object (e.g. an external portion or an internal portion). Accordingly, the regions of the build material corresponding to these portions of the object may be part of the same layer, or different layers. More specifically, and as stated above, the gap region, band of detailing agent, and the fusing agent region(s) of build material may be part of the same layer of build material (in which case they are separated in the x and/or y direction with reference to the build bed) or may each be part of a separate layer (in which case they are separated in the z-direction with reference to the build bed), or may be a combination of the two (for example for the sphere as shown in FIG. 3A a band of detailing agent is part of a first layer (layer 311 corresponding to slide 305) and a second layer (layer 317 corresponding to slice 306). Accordingly, in one example, the object model data may be processed by a slicer to generate a plurality of slices, each slice corresponding to a respective layer of build material used to generate the object. This therefore represents an object defined by the object model data into a series of 2D images to define which regions of each layer of build material are to be solidified and what colour the (regions of the) layers are to have. A printer may process each slice to determine which combination of print agents are to be used to cause the object layer to be generated from each slice. In particular therefore processing each slice may define the gap of detailing agent, the fusing agent region and the band of detailing agent adjacent the gap region on a single layer of build material or on multiple layers of build material depending on the intended colour(s). These examples therefore allow an object having contrasting colours (e.g. the first and second colours, in one example black and white, respectively) to be generated. For example, an object may be generated according to the method 100 with unique information on or in the object, for example a logo, pattern, identification code, text etc. which is visible through the contrasting first and second colours. In examples where the fusing agent is black and the build material is white a barcode may be produced in an internal portion, external surface, or combination thereof of the object, with the black areas of the barcode corresponding to the third region (to which fusing agent is applied) and the white areas of the barcode corresponding to the second region (to which no agents are applied). Accordingly, in one example the first colour is darker than the second colour.

In one example, the first portion of the object is a portion of an external surface of the object. In this example the method 100 may be to generate an object, at least a portion of the external surface of which has its colour the same colour as the build material used to generate the object. Part of an internal portion of the object may correspond to the fusing agent region of build material to which fusing agent was applied and therefore may have a greater degree of fusion and therefore such parts may have good structural/mechanical integrity, e.g. strong structural core, but may be the colour of the build material (e.g. white) in appearance. If the fusing agent is black, then the core of these parts may be black in these examples. Therefore, in these examples the objects generated may have a white exterior but a black core, the core having greater mechanical properties (e.g. strength) due to the greater degree of fusion inside the object. In another example, a part of the internal portion may correspond to the first portion of the object to have the first colour.

The method 100 may comprise printing (or generating) the object using the object generation instructions. For example, the method may comprise applying energy (e.g. heat) to the layer(s) to fuse the layer(s). For example, this may comprise forming a layer of build material, applying print agents, for example through use of 'inkjet' liquid distribution technologies, in locations specified in the object generation instructions for an object model slice corresponding to that layer, and applying energy, for example heat, to the layer. Some techniques allow for accurate placement of print agent on a build material, for example by using print heads operated according to inkjet principles of two-dimensional printing to apply print agents, which in some examples may be controlled to apply print agents with a resolution of around 600 dpi, or 1200 dpi. A further layer of build material may then be formed and the process repeated, with the object generation instructions for the next slice. Energy is therefore applied in order for the build material to surpass its melting temperature. The same energy configuration may be used to generate the objects (e.g. objects with a combination of first and second colours) since the same fusing and detailing agents are used to produce the colour contrasts.

In some examples, blocks 102-106 may be carried out at least partially concurrently with object generation. As the processes of blocks 102-106 can be relatively resource heavy in terms of processing power and memory storage, this may make efficient use of the resources available.

In some examples, determining object generation instructions may comprise applying halftoning to voxel locations associated with object generation parameters to determine object generation or print instructions for the layer. As will be familiar to the skilled person, halftoning can result in the selection of a particular print agent in a particular location. For example, an object generation parameter may specify an area coverage or contone level for a print agent. A halftoning screen or algorithm may be used to make selections of locations and amounts of print agents to be placed to produce an intended result (which may be fusion of build material in a simple example), for example based on the area coverage. While halftoning is used in this example, in other examples, other techniques may be used. For example, if using piezo printheads, a drop volume could be directly specified.

Obtaining (e.g. at block 102) may comprise generating, retrieving, or determining. For example, block 102 may comprise generating, retrieving or determining the object model data.

Figure 4:
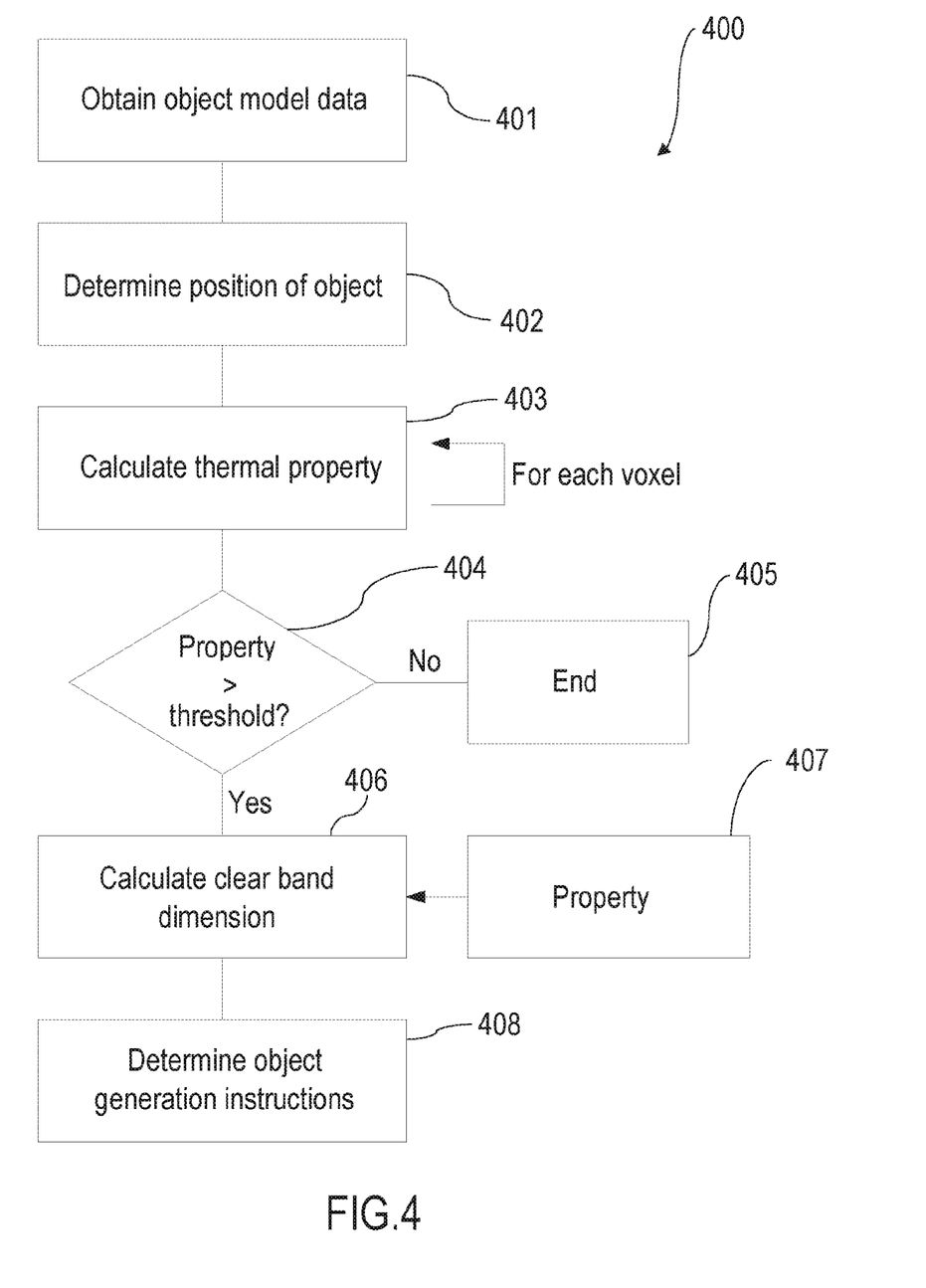
FIG. 4 is a flowchart of an example method of generating a three-dimensional object in a 3D printing system.

FIG. 4 shows an example method 400 of generating a three-dimensional object in a 3D printing system using a fusing agent of a first colour, a detailing agent (e.g. a transparent detailing agent), and a build material of a second colour, the second colour being different from the first colour. The method 400 comprises, in blocks 401 and 402, respectively, obtaining object model data and determining a first portion of the object to be generated to have the second colour, for example as described above with reference to blocks 102 and 104 respectively of the example method 100.

The object model data of the example of FIG. 4 the object model data describes the object in terms of voxels, each voxel representing an addressable region of a layer of build material used to generate the object. The method comprises, at block 403, calculating a thermal property for an addressable region. As indicated by the looping arrow block 403 is performed for each addressable region. The thermal property may be one of heat capacity, thermal conductivity, thermal diffusivity, specific heat, melting point, and/or thermal expansion coefficient. Block 403 may comprise using a heat prediction model. At block 404 the method comprises determining whether the thermal property is over a thermal threshold. For example, block 404 may comprise determining whether the thermal conductivity of an addressable region is above a minimum thermal conductivity.

In one example, the method 400 may comprise determining the exact position and dimension of each addressable region. For example the method 400 may comprise determining the (x,y,z) coordinates of each addressable region relative to an origin in the print bed. The method 400 may comprise determine the distance of each addressable region to the boundary of the print bed. In block 404 the comparison with the acceptable threshold may take into account the determined position and/or dimension of each addressable region. Therefore, the determination at block 404 may take into account a plurality of properties including a thermal property of an addressable region.

Block 404 may therefore represent a determination as to whether it is feasible to generate the object described by the object model data using the build material. Block 404 may therefore be considered to be a feasibility-assessment block. For example if the determined thermal property is below the minimum acceptable threshold this may indicate that the method 4500 may be unable to generate the object described by the object model data, since (for example) the thermal property may indicate that a clear band (which is to fuse to become the first portion of the object) will not be able to be defined having regard to the type of build material being used and the geometry of the object, etc. Therefore, at block 404 it may be decided whether the object is suitable to comprise a portion having the colour of the build material, taking into account the geometry of the part and the type of build material being used. In one example, block 404 may represent a determination as to whether it is possible for a layer of build material to have enough thermal mass to generate the thermal bleed to heat and fuse the gap region.

In one example, block 403 comprises calculating the heat differential between neighbouring addressable regions. In this way a measure of how much heat will be able to flow into the clear band (e.g. whether this heat is sufficient to fuse the gap region) may be determined, and compared at block 404 to determine whether the thermal differential is enough so that the gap region will fuse when energy is applied to the first region. In one example, the addressable region of build material may be part of the first region, or the gap region, or both.

If, at block 404, it is determined that the thermal property is not above a minimum acceptable threshold then at block 405 the method ends. This represents a determination that it is not possible to generate the object described by the object model data. This may represent a determination that it is not possible, having regard to the geometry of the object and the type of build material used, to define a gap region that is able to fuse by the thermal bleed from the first region of build material. On the other hand, if, at block 404, it is determined that the thermal property is above a minimum acceptable threshold then the method proceeds to block 406 at which a dimension (e.g. a width) of the gap region is calculated such that heat from the fusing agent region of build material that corresponds to the first portion, following application of energy to fuse the fusing agent region, is sufficient to fuse the gap region by thermal bleed from the first region. As schematically represented by block 407, the calculation at block 406 may take into account at least one property, for example the type of build material, the geometry of the object (e.g. an area thereof), thermal mass of a part of the object, etc. as the dimension of the clear band may vary according to the material used and the geometry of the object. The dimension of the gap region may be a width, for example may be the distance (e.g. a minimum distance or maximum distance) from the boundary between the gap region and the fusing agent region and the boundary between the gap region and the band of detailing agent. The dimension of the gap region may, in some examples, be calculated to be between 80 μm and 1 mm, with the actual value being dependent on parameters such as the type of build material and object geometry etc.

The thermal property and the thermal threshold may be previous determined (e.g. via testing) and may be stored in a database. Blocks 402 and 404 may therefore comprise accessing a database and determining, e.g. via a look-up table, the thermal property and/or the thermal threshold, respectively. These may be dependent on the parameters, such as those represented at block 407.

Once the dimension of the clear band has been calculated at block 406 the method proceeds to block 408 which comprises determining object generation instructions to generate a first portion of the object to have the second colour, for example as described above with reference to block 106 of the example method 100.

Figure 5:
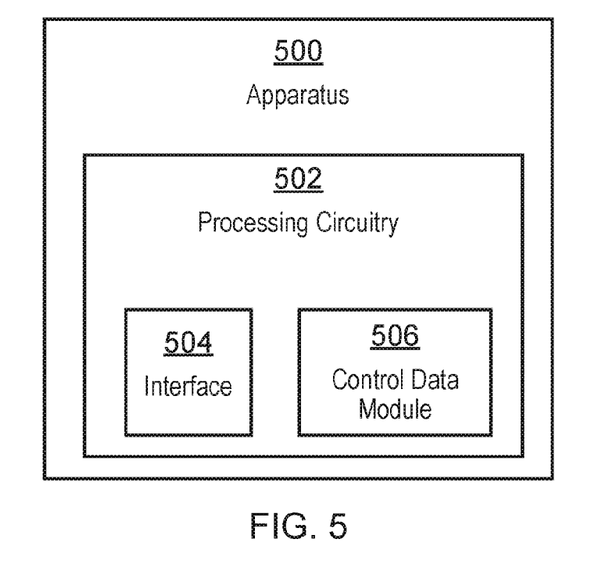
FIG. 5 is a simplified schematic drawing of an example of apparatus for processing data for additive manufacturing.

FIG. 5 shows an example apparatus 500 comprising processing circuitry 502. The processing circuitry 502 comprises an interface 504 and a control data module 506. The interface 504 is to obtain (for example, generate, determine or receive) object model data. The object model data describes at least a portion of an object to be generated by additive manufacturing using a fusing agent of a first colour and a build material having a second colour different to the first colour. The object model data is also to determine a first portion of the object to be generated to have the second colour. The control data module 506 is to generate control data to control a 3D printer to generate the first portion of the object to have the second colour by defining a gap region of a layer of build material that is to correspond to the first portion of the object on which no agents are to be applied, a band of detailing agent on a layer of build material immediately adjacent to the gap region to define an outer limit of the gap region and therefore a boundary of the first portion of the object, and a fusing agent region on a layer of build material next adjacent the gap region and on which fusing agent is to be applied.

In one example the interface 504 is to determine a second portion of the object to have the first colour (the colour of the fusing agent) and the control data module 506 is to generate control data to control a 3D printer to generate the second portion of the object by defining a fusing agent region on a layer of build material that is to correspond to the second portion on which fusing agent is to be applied, and a band of detailing agent on a layer of build material immediately adjacent to the fusing agent region corresponding to the second portion.

The apparatus 500 is to generate a 3D object (e.g. the object defined by the object model data) using the control data generated by the control data module. In one example the control data may be to cause a print agent applicator to apply fusing and/or detailing agent to a layer, or to layers, of build material, according to the control data to generate (portions of) the object. In one example, the control data may define a pattern of fusing agent to be applied to the build material. The apparatus 500 may therefore comprise a print agent applicator to apply fusing and/or detailing agent. In some examples, the processing circuitry 502 or the modules thereof may carry out any or a combination of the blocks of FIG. 1 or 2. For example, the control data may be to define the clear band, band of detailing agent, and first region of build material as described above with reference to FIGS. 1 and 2.

Accordingly, in one example the object model data may describe the object in terms of voxels, or may be converted to provided such a voxel representation, each voxel representing an addressable region of a layer of build material used to generate the object, and the control data is to calculate a thermal property of at least one addressable region and to determine whether the thermal property is over a threshold, for example as discussed above with reference to the example of FIG. 4. In this example, and if it is determined that the thermal property is over the threshold, the control data is to calculate a dimension of the gap region such that heat from the fusing agent region of the layer, following application of energy to fuse the fusing agent region, is sufficient to fuse the gap region by thermal bleed from the fusing agent region, for example as discussed above with reference to the example of FIG. 4.

Figure 6:
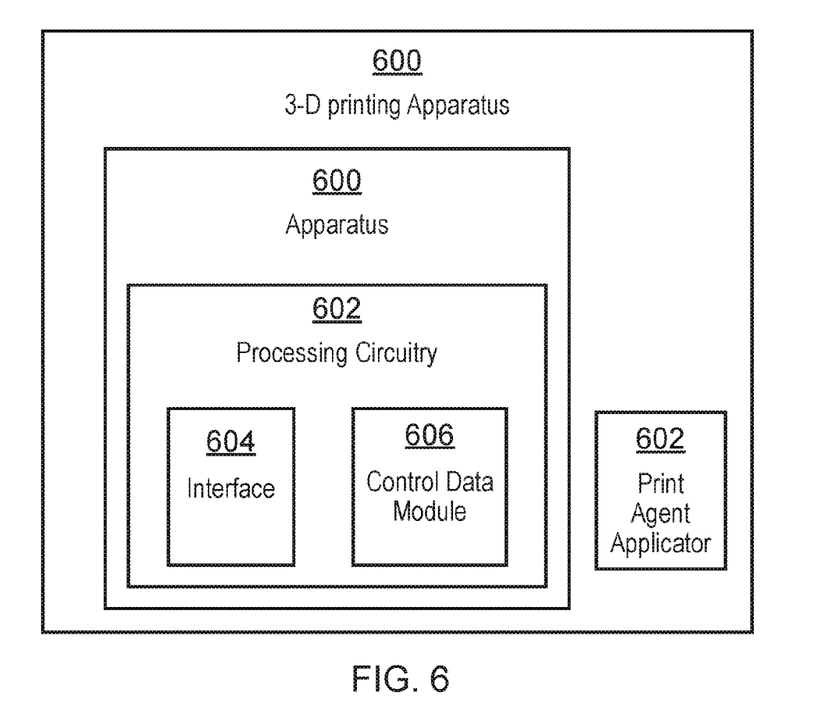
FIG. 6 is a simplified schematic drawing of an example apparatus for additive manufacturing.

FIG. 6 shows an example of a 3-D printing apparatus 600 comprising the apparatus 500 of FIG. 5. The 3-D printing apparatus 600 comprises a print agent applicator 602. The print agent applicator 602 is to apply fusing agent, under control of the control instructions generated by the control data module 606.

In some examples, the 3-D printing apparatus 600 may operate under the control of control data generated based on the print instructions to generate at least one object in a plurality of layers according to the generated control data/print instructions. The 3-D printing apparatus 600 may generate an object in layer-wise manner by selectively solidifying portions of layers of build materials. The selective solidification may in some examples be achieved by selectively applying print agents, for example through use of 'inkjet' liquid distribution technologies, and applying energy, for example heat, to the layer. The 3-D printing apparatus 600 may comprise additional components not shown herein, for example a fabrication chamber, a print bed, print head(s) for distributing print agents, a build material distribution system for providing layers of build material, energy sources such as heat lamps and the like, which are not described in detail herein.

The 3-D printing apparatus 600 may carry out any or any combination of the blocks of FIG. 1 or FIG. 4.

Figure 7:
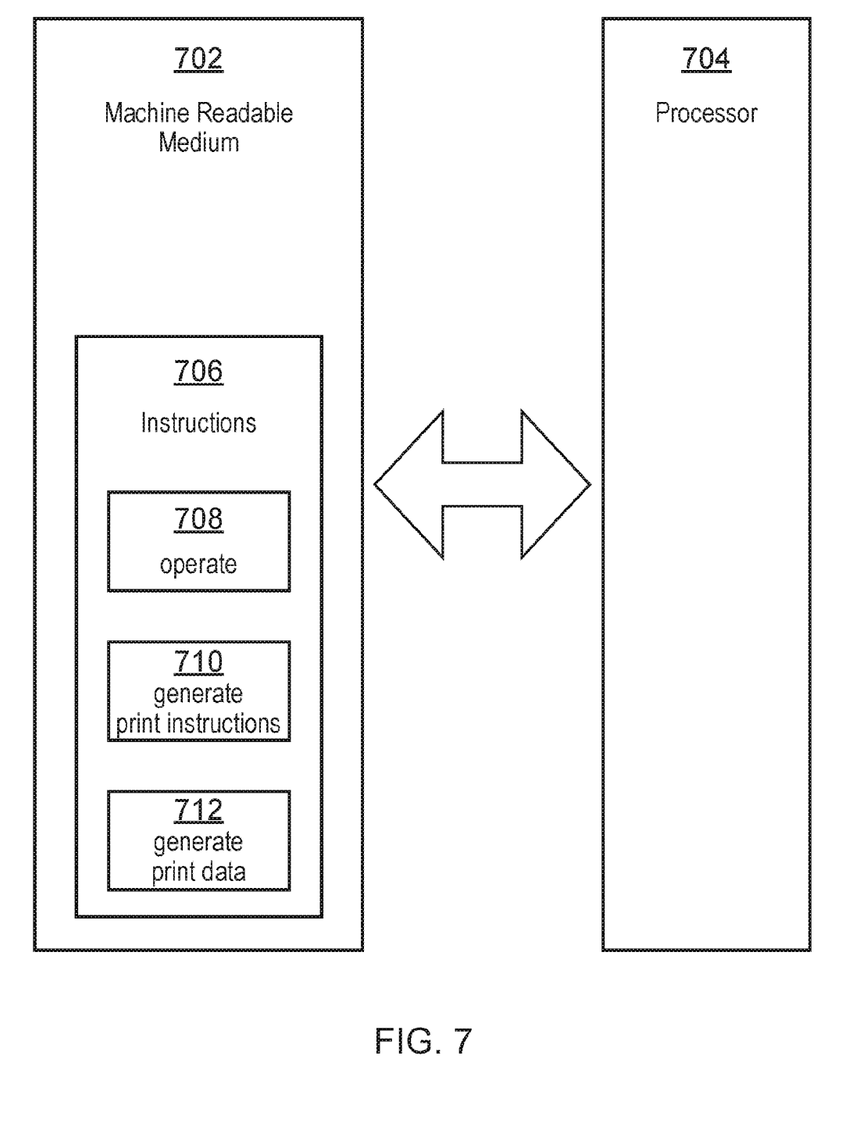
FIG. 7 is an example of a machine-readable medium in association with a processor.

FIG. 7 shows an example tangible (and non-transitory) machine-readable medium 702 in association with a processor 704. The tangible machine-readable medium 702 comprises instructions 706 which, when executed by a processor 704, cause the processor 704 to carry out a plurality of tasks. The instructions 706 comprise instructions 708 to operate on machine-readable object model data describing an object to be manufactured and machine-readable colour data describing an intended colour of a portion of the object, the intended colour being the colour of a build material used to generate the object. The instructions 706 comprise instructions 710 to generate print instructions to generate a first portion of the object having the intended colour. The instructions 706 comprise instructions 712 to generate print data to cause fusing agent and detailing agent to be applied to at least one layer of build material according to a pattern. According to the pattern, no agents are to be applied in a gap area of build material corresponding to the first portion of the object, a band of detailing agent defines the outer limit of the gap area, and fusing agent is to be applied to a first area of build material next to the gap area.

The gap area may be, at least in part, in between the band of detailing agent and the first area of build material. Therefore, the clear band comprises a boundary, a first part of the boundary is a boundary between the clear band and the first area of build material and a second part of the boundary is a boundary between the clear band and the band of detailing agent.

Accordingly, the pattern defines a gap area so that the first portion of the object having the second colour (the colour of the build material) corresponds to the gap area. In this way, the gap area contains no agents and so the heat from the first area of build material will bleed into the gap area to fuse the build material in the gap area. The outer limit of the second area is defined by a band of detailing agent immediately adjacent to the gap area to prevent the thermal bleed beyond the gap area. In other words, the band of detailing agent is to control the thermal bleed from the first area of build material when head is applied to fuse the first area. Accordingly, in one example the instructions 706 may comprise instructions to cause energy to be applied to the first area of build material to fuse the first area, fusing the gap area by thermal bleed from the first area.

The machine readable medium 702 of the example of FIG. 7 may comprise instructions to perform any, or a combination, of the blocks of the methods 100 and 400 as set out in FIGS. 1 and 4, respectively; and/or to provide the interface 502 and/or the control data module 504 of the examples of FIGS. 5 and 6.

For example, the instructions 706 may comprise instructions to cause the processor 704 to calculate a thermal property of at least one addressable region (the machine-readable object data in this example describing the object in terms of voxels, each voxel representing an addressable region of a layer of build material used to generate the object) and to determine whether the thermal property is over a thermal threshold, for example as described with reference to FIG. 4. In this example the instructions 706 may comprise instructions to cause the processor 704 to calculate a dimension of the gap area such that heat from the first area of the layer, following application of the energy to fuse the first area, is sufficient to fuse the gap area by thermal bleed from the first area, for example as described above with reference to FIG. 4. As also described with reference to FIG. 4, in one example the gap area may have a width of between 60 μm and 1 mm.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method for generating a three-dimensional (3D) object to visibly have a second color using a 3D printing apparatus that employs build material, a fusing agent, and a detailing agent, the build material having the second color, the fusing agent having a first color different than the second color, the method comprising:
  obtaining, by a processor, object model data describing the object to be generated, the object having an exterior portion and an interior portion adjacent to the exterior portion;
  determining, by the processor, object generation instructions to generate the object by, for each of a plurality of layers of build material:
    defining a gap region of the layer corresponding to the exterior portion of the object and on which no fusing agent and no detailing agent are to be applied;
    defining a fusing agent region of the layer adjacent to the gap region at an interior side thereof, corresponding to the interior portion of the object, and on which the fusing agent but no detailing agent is to be applied; and
    defining a detailing agent region of the layer adjacent to the gap region at an exterior side thereof, not corresponding to any portion of the object, and on which the detailing agent but no fusing agent is to be applied; and
  causing, by the processor, the 3D printing apparatus to generate the object in accordance with the object generation instructions,
  wherein the interior portion of the object has the first color of the fusing agent and is fused as a result of the fusin agent applied on the fusing agent region of each layer absorbing energy sufficient to melt the build material,
  wherein the exterior portion of the object has the second color of the build material and is fused as a result of sufficient thermal bleed from the energy absorbed by the fusing agent on the fusing agent region adjacent to the gap region,
  and wherein the detailing agent region is not fused as a result of the detailing agent applied on the detailing agent region.

2. The method according to claim 1, wherein the object model data describes the object using voxels that each voxel represent an addressable region of one of the layers of build material used to generate the object, the method further comprising:
  calculating a thermal property of at least one addressable region,
  determining whether the thermal property is over a thermal threshold.

3. The method according to claim 2, wherein calculating the thermal property comprises calculating a heat differential between neighbouring addressable regions.

4. The method according to claim 2, wherein the addressable region is part of the fusing agent region and/or the gap region.

5. The method according to claim 2, further comprising, in response to determining that the thermal property is over the thermal threshold:
  calculating a dimension of the gap region such that heat from the fusing agent region, following application of the energy to fuse the fusing agent region, is sufficient to fuse the gap region by thermal bleed from the fusing agent region.

6. The method according to claim 1, wherein the 3D printing apparatus is to generate the object in accordance with the object generation instructions by:
  depositing the layers of build material on a layer-by-layer basis and selectively applying the fusing agent and the detailing agent in accordance with the fusing agent region and the detailing agent region, respectively; and
  applying the energy to the layers of build material to directly fuse the build material in the fusing agent region of each layer and to indirectly fuse the build material in the gap region of each layer via thermal bleed.

7. A non-transitory computer-readable data storage medium storing instructions executable by a processor to perform processing for generating a three-dimensional (3D) object to visibly have a second color using a 3D printing apparatus that employs build material, a fusing agent, and a detailing agent, the build material having the second color, the fusing agent having a first color different than the second color, the processing comprising:

obtaining object model data describing the object to be generated, the object having an exterior portion and an interior portion adjacent to the exterior portion;

determining object generation instructions to generate the object by, for each of a plurality of layers of build material:

defining a gap region of the layer corresponding to the exterior portion of the object and on which no fusing agent and no detailing agent are to be applied;

defining a fusing agent region of the layer adjacent to the gap region at an interior region thereof, corresponding to the interior portion of the object, and on which the fusing agent but no detailing agent is to be applied; and defining a detailing agent region of the layer adjacent to the gap region at an exterior side thereof, not corresponding to any portion of the object, and on which the detailing agent but no fusing agent is to be applied; and causing the 3D printing apparatus to generate the object in accordance with the object generation instructions, wherein the interior portion of the object has the first color of the fusing agent and is fused as a result of the fusing agent applied on the fusing agent region of each layer absorbing energy sufficient to melt the build material, wherein the exterior portion of the object has the second color of the build material and is fused as a result of sufficient thermal bleed from the energy absorbed by the fusing agent on the fusing agent region adjacent to the gap region, and wherein the detailing agent region is not fused as a result of the detailing agent applied on the detailing agent region.

8. The non-transitory computer-readable medium according to claim 7, wherein the object model data describes the object using voxels that each voxel represent an addressable region of one of the layers of build material used to generate the object, the processing further comprising:

calculating a thermal property of at least one addressable region, determining whether the thermal property is over a thermal threshold.

9. The non-transitory computer-readable medium according to claim 8, wherein calculating the thermal property comprises calculating a heat differential between neighbouring addressable regions.

10. The non-transitory computer-readable medium according to claim 8, wherein the addressable region is part of the fusing agent region and/or the gap region.

11. The non-transitory computer-readable medium according to claim 8, wherein the processing further comprises, in response to determining that the thermal property is over the thermal threshold:

calculating a dimension of the gap region such that heat from the fusing agent region, following application of the energy to fuse the fusing agent region, is sufficient to fuse the gap region by thermal bleed from the fusing agent region.

12. The non-transitory computer-readable medium according to claim 7, wherein the 3D printing apparatus is to generate the object in accordance with the object generation instructions by:

depositing the layers of build material on a layer-by-layer basis and selectively applying the fusing agent and the detailing agent in accordance with the fusing agent region and the detailing agent region, respectively; and applying the energy to the layers of build material to directly fuse the build material in the fusing agent region of each layer and to indirectly fuse the build material in the gap region of each layer via thermal bleed.

13. A system for generating a three-dimensional (3D) object to visibly have a second color using a 3D printing apparatus that employs build material, a fusing agent, and a detailing agent, the build material having the second color, the fusing agent having a first color different than the second color, the system comprising:

a processor;

a memory storing instructions executable by the processor to:

obtain object model data describing the object to be generated, the object having an exterior portion and an interior portion adjacent to the exterior portion;

determine object generation instructions to generate the object by, for each of a plurality of layers of build material:

defining a gap region of the layer corresponding to the exterior portion of the object and on which no fusing agent and no detailing agent are to be applied;

defining a fusing agent region of the layer adjacent to the gap region at an interior side thereof, corresponding to the interior portion of the object, and on which the fusing agent but no detailing agent is to be applied; and defining a detailing agent region of the layer adjacent to the gap region at an exterior side thereof, not corresponding to any portion of the object, and on which the detailing agent but no fusing agent is to be applied; and cause the 3D printing apparatus to generate the object in accordance with the object generation instructions, wherein the interior portion of the object has the first color of the fusing agent and is fused as a result of the fusing agent applied on the fusing agent region of each layer absorbing energy sufficient to melt the build material, wherein the exterior portion of the object has the second color of the build material and is fused as a result of sufficient thermal bleed from the energy absorbed by the fusing agent on the fusing agent region adjacent to the gap region, and wherein the detailing agent region is not fused as a result of the detailing agent applied on the detailing agent region.

14. The system according to claim 13, wherein the object model data describes the object using voxels that each voxel represent an addressable region of one of the layers of build material used to generate the object, the instructions executable by the processor to further:

calculate a thermal property of at least one addressable region, determine whether the thermal property is over a thermal threshold.

15. The system according to claim 14, wherein calculation of the thermal property includes calculation of a heat differential between neighbouring addressable regions.

16. The system according to claim 14, wherein the addressable region is part of the fusing agent region and/or the gap region.

17. The system according to claim 14, wherein the instructions are executable by the processor to further, in response to determining that the thermal property is over the thermal threshold:
- calculate a dimension of the gap region such that heat from the fusing agent region, following application of the energy to fuse the fusing agent region, is sufficient to fuse the gap region by thermal bleed from the fusing agent region.

18. The system according to claim 13, wherein the 3D printing apparatus is to generate the object in accordance with the object generation instructions by:
- depositing the layers of build material on a layer-by-layer basis and selectively applying the fusing agent and the detailing agent in accordance with the fusing agent region and the detailing agent region, respectively; and
- applying the energy to the layers of build material to directly fuse the build material in the fusing agent region of each layer and to indirectly fuse the build material in the gap region of each layer via thermal bleed.

19. The system according to claim 13, wherein the 3D printing apparatus is part of the system.

20. The system according to claim 13, wherein the 3D printing apparatus is not part of the system.

* * * * *